US 11,680,609 B2

(12) United States Patent
Hiroshima et al.

(10) Patent No.: US 11,680,609 B2
(45) Date of Patent: Jun. 20, 2023

(54) UNIDIRECTIONAL JOINT

(71) Applicant: TOYOTA BOSHOKU KABUSHIKI KAISHA, Aichi (JP)

(72) Inventors: Masashi Hiroshima, Aichi (JP); Wataru Sakaguchi, Aichi (JP); Yasuaki Suzuki, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 17/989,018

(22) Filed: Nov. 17, 2022

(65) Prior Publication Data

US 2023/0160441 A1 May 25, 2023

(30) Foreign Application Priority Data

Nov. 25, 2021 (JP) .............................. JP2021-191139

(51) Int. Cl.
*F16D 41/063* (2006.01)

(52) U.S. Cl.
CPC .................... *F16D 41/063* (2013.01)

(58) Field of Classification Search
CPC ...................................... F16D 41/063
USPC .......................... 192/45.1; 74/574.4
See application file for complete search history.

(56) References Cited

U.S. PATENT DOCUMENTS

| 7,022,023 B2* | 4/2006 | Guo ........................ F16D 3/76 464/180 |
| 2009/0078078 A1* | 3/2009 | Manzoor ............. F16F 15/1442 74/574.4 |
| 2013/0216262 A1* | 8/2013 | Miyagawa ............ F16F 15/124 399/167 |
| 2014/0360312 A1* | 12/2014 | Gurses ................ F16F 15/1217 74/574.4 |

FOREIGN PATENT DOCUMENTS

JP            2001-28863           1/2001

* cited by examiner

*Primary Examiner* — Colby M Hansen
(74) *Attorney, Agent, or Firm* — Greenblum & Bernstein, P.L.C.

(57) ABSTRACT

A unidirectional joint includes a wedge member having a pressure contact portion that comes in pressure contact with an inner circumferential surface of an immovable ring. The wedge member includes a first follower displacing the wedge member to an unlocked position by receiving a pressing force from a release cam when a driving force is input to an input side protrusion and a second follower displacing the wedge member to a locked position by receiving a pressing force from a pressure cam when a driving force is input to an output side rotating part.

8 Claims, 12 Drawing Sheets

UNIDIRECTIONAL JOINT

CROSS-REFERENCE TO RELATED APPLICATIONS

The present application claims the benefit of Japanese Patent Application No. 2021-191139 filed on Nov. 25, 2021 with the Japan Patent Office, and the entire disclosure of Japanese Patent Application No. 2021-191139 is incorporated herein by reference.

BACKGROUND

The present disclosure relates to a unidirectional joint capable of inhibiting a driving force input to an output shaft from being transmitted to an input shaft.

For example, Japanese Unexamined Patent Application Publication No. 2001-28863 (hereinafter, to be referred to as "Patent Document 1") discloses a clutch using a steel ball as a unidirectional joint. Specifically, in the clutch, when a driving force is input to a worm shaft, a steel ball comes in pressure contact with a clutch housing, which has a cylindrical shape, to stop rotation of the worm shaft, thereby interrupting transmission of the driving force from the worm shaft to a rotation shaft.

SUMMARY

The invention described in Patent Document 1 is configured to make the steel ball come in pressure contact with the clutch housing, making it difficult to alter a contact surface pressure depending on specifications.

In light of the aforementioned problem, the present disclosure discloses an example of a unidirectional joint using a wedge member configured by a non-rolling element.

It is desirable that a unidirectional joint according to one aspect of the present disclosure, the unidirectional joint having an input side rotating part to which a driving force is input and an output side rotating part outputting the driving force, transmitting the driving force from the input side rotating part to the output side rotating part, and inhibiting a driving force input to the output side rotating part from being transmitted to the input side rotating part, includes, for example, at least one of the following elements.

The elements are: a transmission part including an input side protrusion, which integrally rotates with the input side rotating part, and an output side protrusion, which integrally rotates with the output side rotating part, wherein the input side protrusion and the output side protrusion engage with each other when the driving force is input to the input side rotating part, to thereby transmit the driving force from the input side rotating part to the output side rotating part; an immovable ring retained in a non-rotatable state; a wedge member including a pressure contact portion, which comes in pressure contact with a circumferential surface of the immovable ring, the wedge member being configured by a non-rolling element and being displaceable between a locked position where the pressure contact portion comes in pressure contact with the circumferential surface and an unlocked position where the pressure contact is released; a release cam integrally rotatable with the input side rotating part; a first follower provided in the wedge member, the first follower displacing the wedge member to the unlocked position by receiving a pressing force from the release cam when the driving force is input to the input side rotating part; a pressure cam integrally rotatable with the output side rotating part; and a second follower provided at a position deviated from the first follower in the wedge member, the second follower displacing the wedge member to the locked position by receiving a pressing force from the pressure cam when the driving force is input to the output side rotating part.

Due to this, in the unidirectional joint, when the driving force is input to the input side rotating part, the wedge member is in the locked position and comes in pressure contact with the immovable ring, and thus transmission of the driving force from the output side rotating part to the input side rotating part is interrupted.

The wedge member is provided with the first follower displacing the wedge member to the unlocked position and the second follower displacing the wedge member to the locked position, which are disposed separately from each other. Thus, in the unidirectional joint, each of the first follower and the second follower can be formed into a shape suitable thereto.

The unidirectional joint may have, for example, a configuration as described below.

When a diametrical direction of the immovable ring is defined as a radial direction, it is desirable that the pressure contact portion is deviated with respect to the second follower in the radial direction, and a curvature radius of the pressure contact portion is larger than a curvature radius of the second follower. This inhibits an excessive increase in the contact surface pressure of the pressure contact portion.

When a circumferential direction of the immovable ring is defined as a circumferential direction, it is desirable that a retainer is provided, the retainer having a holder to keep a posture of the wedge member by interposing the wedge member between both sides of the holder in the circumferential direction. This can inhibit the wedge member coming in pressure contact with the immovable ring from having an inappropriate posture.

The release cam is desirably arranged at the retainer. Furthermore, it is desirable that, when the driving force is input to the input side rotating part, the retainer is pressed by the input side protrusion, whereby the release cam presses the first follower. It is furthermore desirable that the output side protrusion and the pressure cam are integrated in the output side rotating part.

BRIEF DESCRIPTION OF THE DRAWINGS

An example embodiment of the present disclosure will be described hereinafter by way of example with reference to the accompanying drawings, in which.

DETAILED DESCRIPTION OF EXEMPLARY EMBODIMENTS

Figure 1:
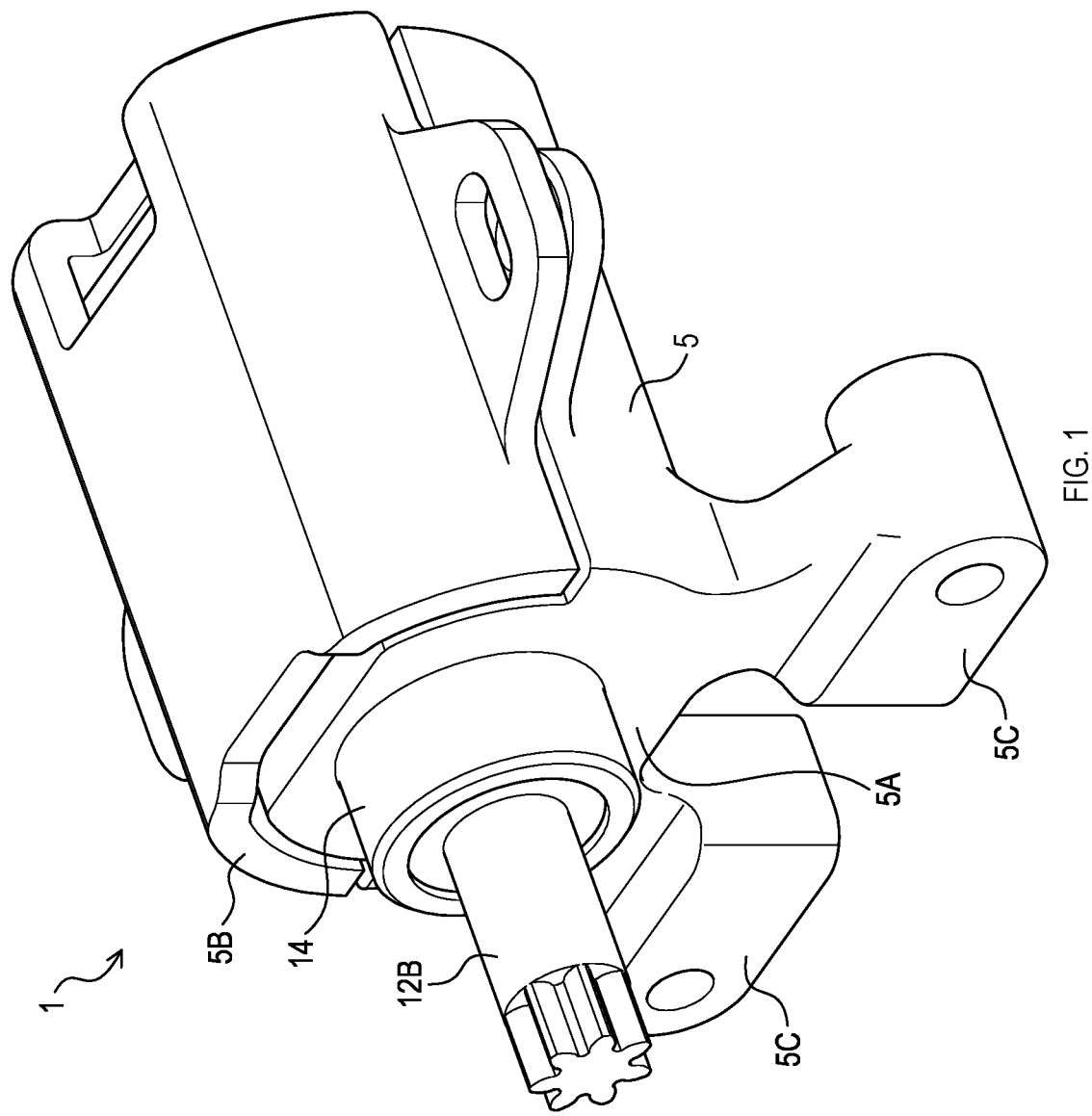
FIG. 1 is a view showing an actuator according to a first embodiment.

An embodiment explained hereinafter shows one example of embodiments belonging to the technical scope of the present disclosure. In other words, matters to specify the invention recited in the claims are not limited to specific configurations or structures that are shown in the embodiments explained hereinafter.

The present embodiment provides an example in which a unidirectional joint according to the present disclosure is applied to a seat mounted to a vehicle such as an automobile (hereinafter, to be referred to as "vehicle seat"). Arrows that indicate axes and directions and hatched lines in the drawings are made for easy understanding of relationship between the drawings or shape of a member or portion.

Thus, the unidirectional joint is not limited by directions in the drawings. Axes and directions in the drawings are defined in relation to the vehicle seat according to the present embodiment that is assembled to a vehicle. Drawings including hatched lines are not necessarily cross-section views.

At least in respect of a member or portion that is labeled with a reference numeral for explanations, there is at least one in number of such a member or portion unless the number is otherwise specified as "only one of" or the like. In other words, there may be two or more of such a member or portion when the number is not specified as "only one of" or the like.

First Embodiment

<1. Overview of Unidirectional Joint>

The present embodiment provides an example in which a unidirectional joint 10 according to the present embodiment (see, FIG. 2) is applied to an actuator 1 (see, FIG. 1) used in a vehicle seat. The actuator 1 generates a driving force that displaces a movable portion of the vehicle seat.

Examples of the movable portion of the vehicle seat include: a lifter arm to move a seat cushion up and down; a tilt arm that moves a front end side of the seat cushion up and down; and a recliner that displaces a seatback.

<1.1 Schematic Configuration of Actuator>

Figure 2:
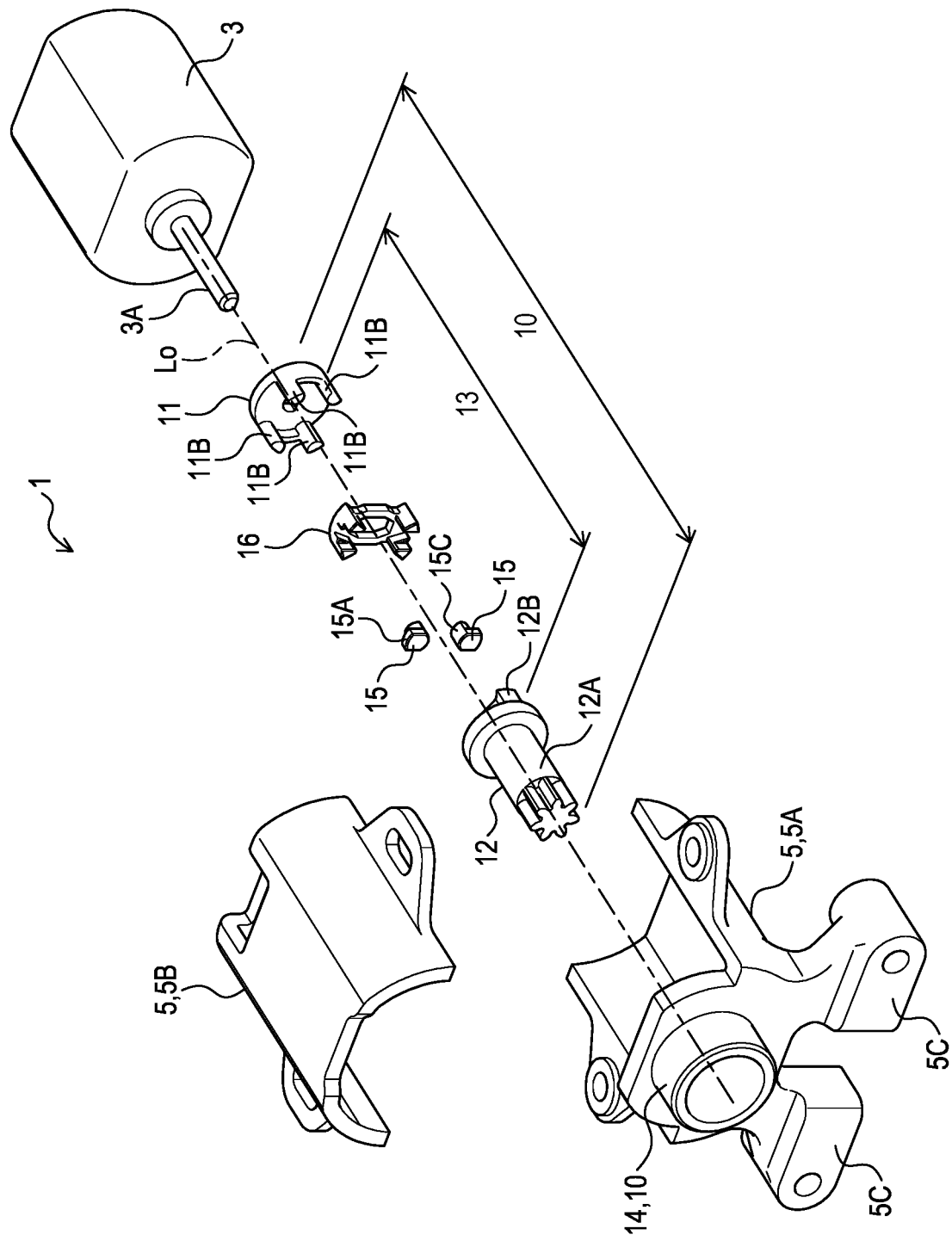
FIG. 2 is an exploded view of the actuator according to the first embodiment.

As shown in FIG. 2, the actuator 1 includes: an electric motor 3; the unidirectional joint 10; a housing 5; and the like. The electric motor 3 generates a driving force. The housing 5 houses the electric motor 3 and the unidirectional joint 10.

The housing 5 includes a first housing 5A and a second housing 5B. The first housing 5A and the second housing 5B hold the electric motor 3 so as to interpose the electric motor 3 therebetween. The first housing 5A and the second housing 5B are fastened to each other with a fastener (not shown) such as a screw.

The first housing 5A is provided with at least one (a plurality of, in the present embodiment) fixing portion 5C. Each of the fixing portions 5C is a portion for securing the actuator 1 to a non-movable portion such as a seat frame (not shown).

<1.2 Details of Unidirectional Joint>

The unidirectional joint 10 performs a transmission function for transmitting the driving force of the electric motor 3 (hereinafter, to be referred to simply as "driving force") to the movable portion of the vehicle seat (hereinafter, to be referred to simply as "movable portion") and an interruption function for interrupting the transmission of a rotational force from the movable portion to the electric motor 3 (hereinafter, to be referred to as "reversing force").

As shown in FIG. 2, the unidirectional joint 10 at least includes: an input side rotating part 11; an output side rotating part 12; a transmission part 13; an immovable ring 14; a wedge member 15; a retainer 16; and the like. In the present embodiment, the immovable ring 14 is integrated in the first housing 5A.

<Input Side Rotating Part>

Figure 3:
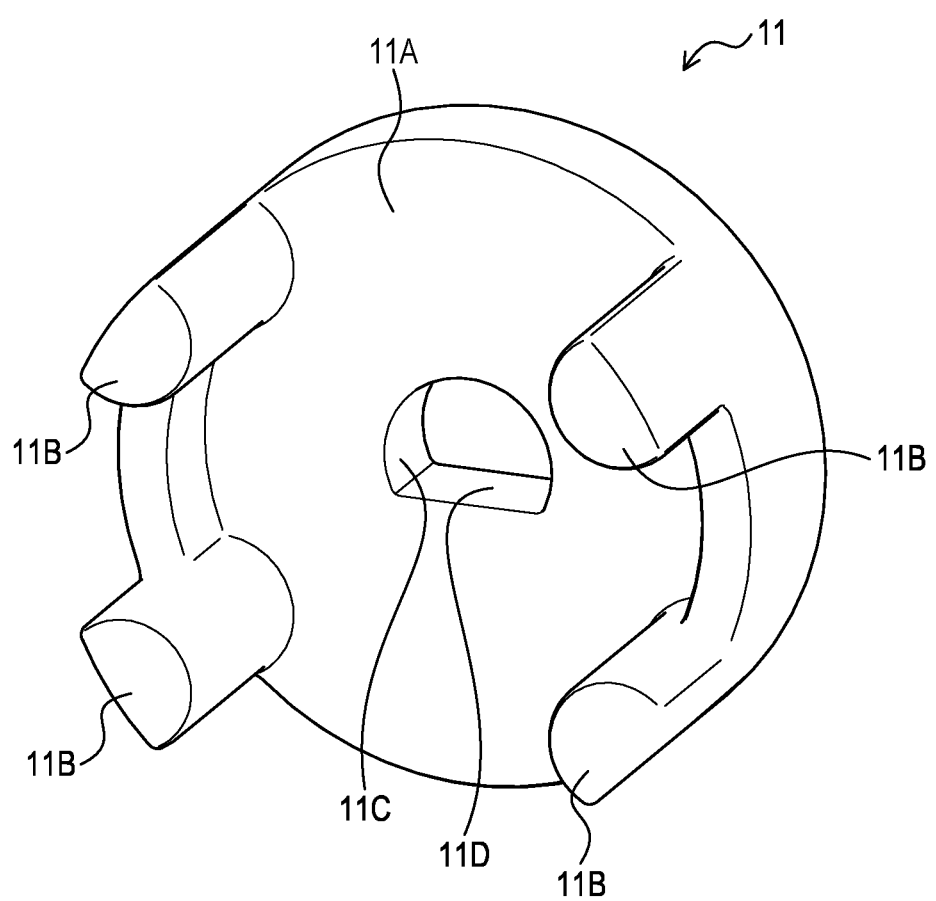
FIG. 3 is a view showing an input side rotating part according to the first embodiment.

The input side rotating part 11 is a member to which the driving force of the electric motor 3 is input. As shown in FIG. 3, the input side rotating part 11 is a driving ring including a joint portion 11A, at least one (a plurality of, in the present embodiment) input side protrusion 11B, and the like.

The joint portion 11A is coupled to a rotor shaft 3A of the electric motor 3 (see, FIG. 2) and integrally rotates with the rotor shaft 3A. Specifically, the joint portion 11A is provided with an engagement hole 11C through which the rotor shaft 3A is inserted.

An inner circumferential surface of the engagement hole 11C includes an engagement surface 11D that engages with an engagement surface provided in the rotor shaft 3A (not shown). Thus, the engagement hole 11C according to the present embodiment is a substantially D-shaped hole.

Each of the input side protrusions 11B revolves around the rotor shaft 3A as a center of revolution. Specifically, each of the input side protrusions 11B is arranged on an outer peripheral side of the joint portion 11A formed in a substantially disk shape and protrudes from the joint portion 11A in a direction parallel to the rotor shaft 3A.

Each of the input side protrusions 11B is configured to be integrated in the joint portion 11A. Thus, each of the input side protrusions 11B revolves integrally with the rotor shaft 3A around the rotor shaft 3A as the center of revolution.

<Output Side Rotating Part>

Figure 4:
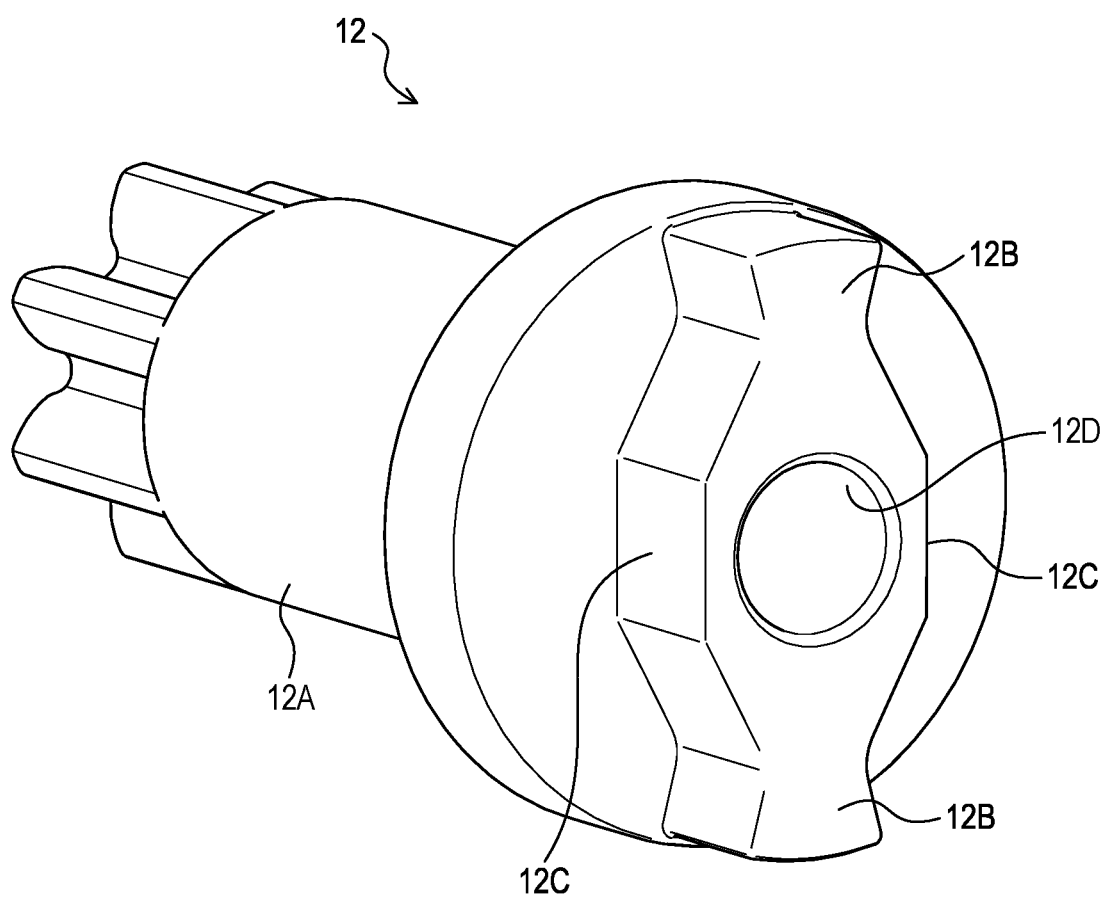
FIG. 4 is a view showing an output side rotating part according to the first embodiment.

The output side rotating part 12 is a member that transmits the driving force input to the input side rotating part 11 to the movable portion. As shown in FIG. 4, the output side rotating part 12 includes: an output shaft 12A; at least one (a plurality of, in the present embodiment) output side protrusion 12B; a pressure cam 12C; and the like.

The output shaft 12A engages with the movable portion to supply the driving force to the movable portion. Each of the output side protrusions 12B revolves around the output shaft 12A as the center of revolution and protrudes parallel to an axis direction of the output shaft 12A toward the input side protrusions 11B.

The pressure cam 12C forms a pressing portion for pressing the wedge member 15. The output shaft 12A, the output side protrusions 12B, and the pressure cam 12C are integrated together. Thus, when the output side protrusions 12B revolve, the output shaft 12A rotates. On the other hand, when the output shaft 12A rotates, the pressure cam 12C rotates about the output shaft 12A.

The rotor shaft 3A, the input side rotating part 11, and the output side rotating part 12 are coaxially arranged so that their respective rotation center axes Lo coincide (see, FIG. 2). The output side rotating part 12 is provided with an insertion hole 12D (see, FIG. 4) through which the rotor shaft 3A is inserted.

The insertion hole 12D does not include an engagement surface that engages with the engagement surface of the rotor shaft 3A. Thus, the driving force is not directly transmitted between the rotor shaft 3A and the output side rotating part 12.

<Transmission Part>

The transmission part 13 includes: the input side protrusions 11B; the output side protrusions 12B; and the like. When the driving force is input to the input side rotating part 11, the input side protrusions 11B and the output side protrusions 12B come into contact to engage with one another (see, FIG. 8). Thus, the driving force input to the input side rotating part 11 is transmitted from the input side rotating part 11 to the output side rotating part 12.

In the present embodiment, respective contact surfaces of the input side protrusions 11B and the output side protrusions 12B are configured such that an imaginary tangent line L1 on contact areas between the input side protrusions 11B and the output side protrusions 12B (see, FIG. 8) passes the rotation center axis Lo of the rotor shaft 3A.

<Immovable Ring>

Figure 5:
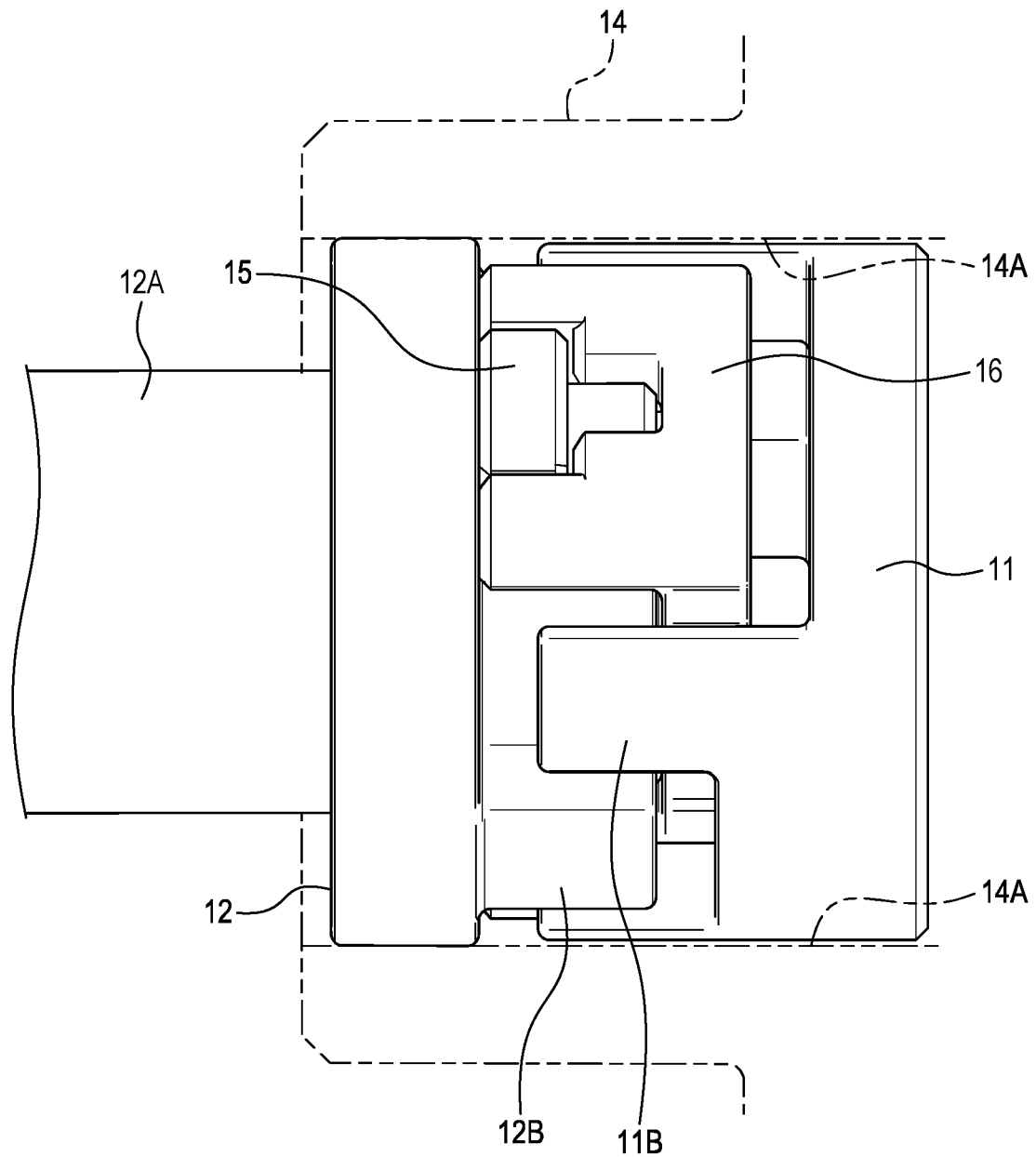
FIG. 5 is a view showing a unidirectional joint according to the first embodiment.

The immovable ring 14 is an annular member that is retained in a non-rotatable state (see, FIG. 2). In the present embodiment, the input side protrusions 11B, the output side protrusions 12B, the wedge member 15, and the retainer 16 are accommodated in the immovable ring 14 (see, FIG. 5).

<Wedge Member, Retainer, and Others>

Figure 6:
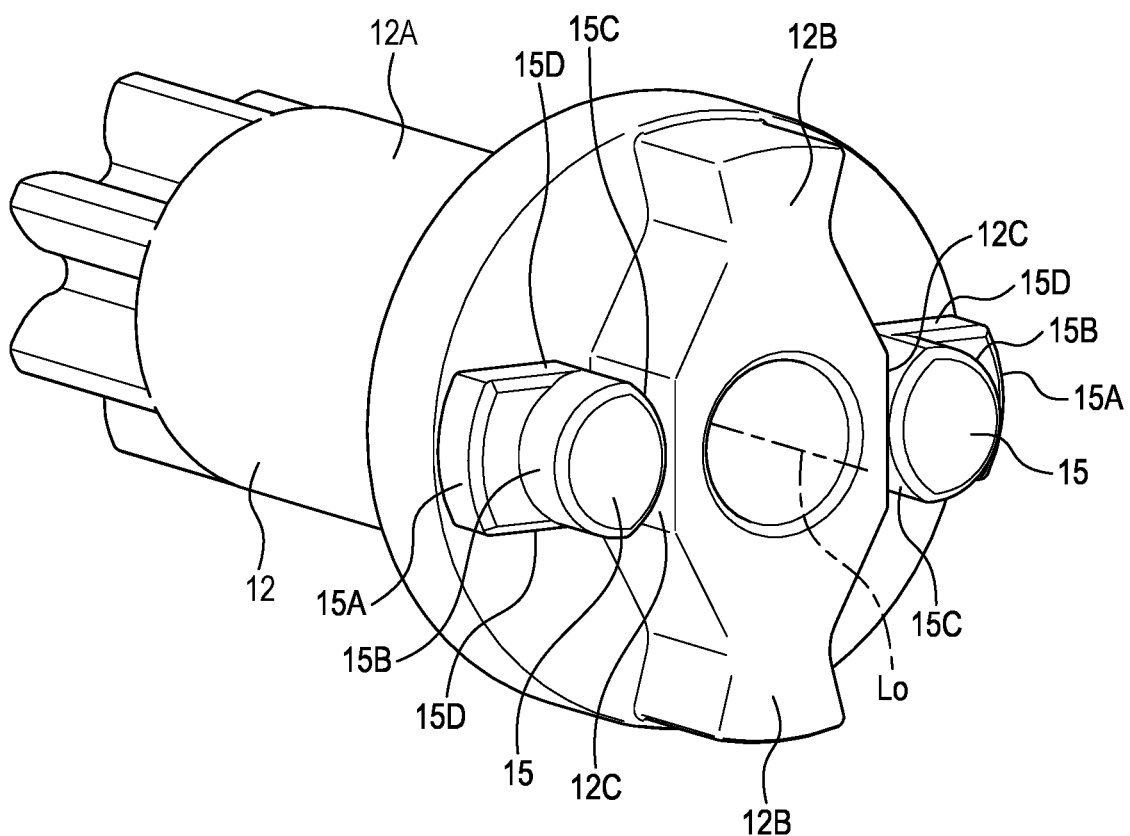
FIG. 6 is a view showing the output side rotating part and a wedge member according to the first embodiment.

As shown in FIG. 6, the unidirectional joint 10 according to the present embodiment includes a plurality of the wedge members 15. Each of the wedge members 15 has a congruent shape relative to one another. A first wedge member 15 and a second wedge member 15 are arranged at positions rotationally symmetric about the rotation center axis Lo.

Figure 7:
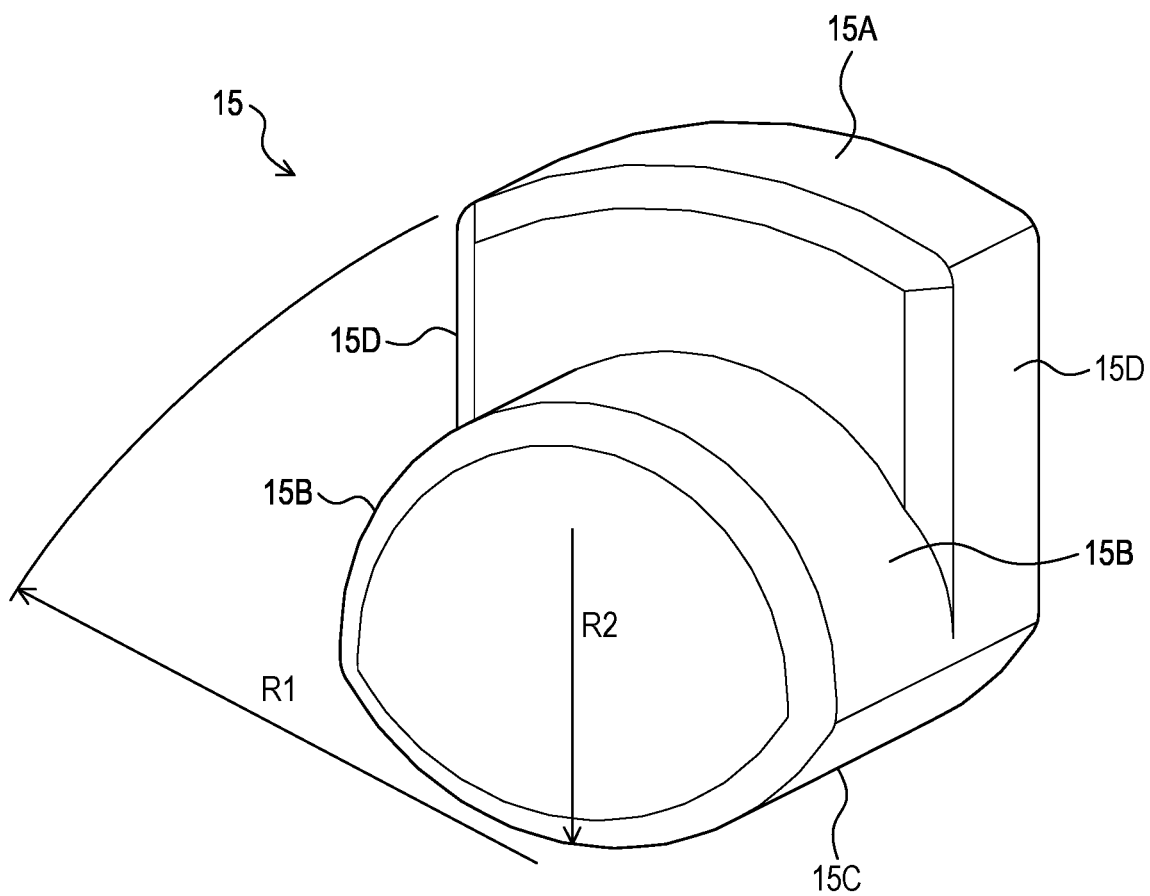
FIG. 7 is a view showing the wedge member according to the first embodiment.

As shown in FIG. 7, each of the wedge members 15 is a non-rolling element including at least a pressure contact portion 15A, a first follower 15B, a second follower 15C, and the like. In other words, each of the wedge members 15 is configured by a non-spherical or non-cylindrical member.

Each of the pressure contact portions 15A is a curved surface that comes in pressure contact with a circumferential surface of the immovable ring 14 at a time of performing the interruption function. The pressure contact portion 15A according to the present embodiment comes in pressure contact with an inner circumferential surface 14A (see, FIG. 5). Each of the wedge members 15 is displaced between a locked position where the pressure contact portion 15A comes in pressure contact with the inner circumferential surface 14A (see, FIG. 9) and an unlocked position where the pressure contact is released (see, FIG. 8).

The state in which "pressure contact is released" means, for example, a state in which the pressure contact portion 15A and the inner circumferential surface 14A are not in contact with each other, or a state in which the pressure contact portion 15A and the inner circumferential surface 14A are in contact with each other to a degree that a contact surface pressure between the pressure contact portion 15A and the inner circumferential surface 14A can be deemed to be zero.

Figure 11:
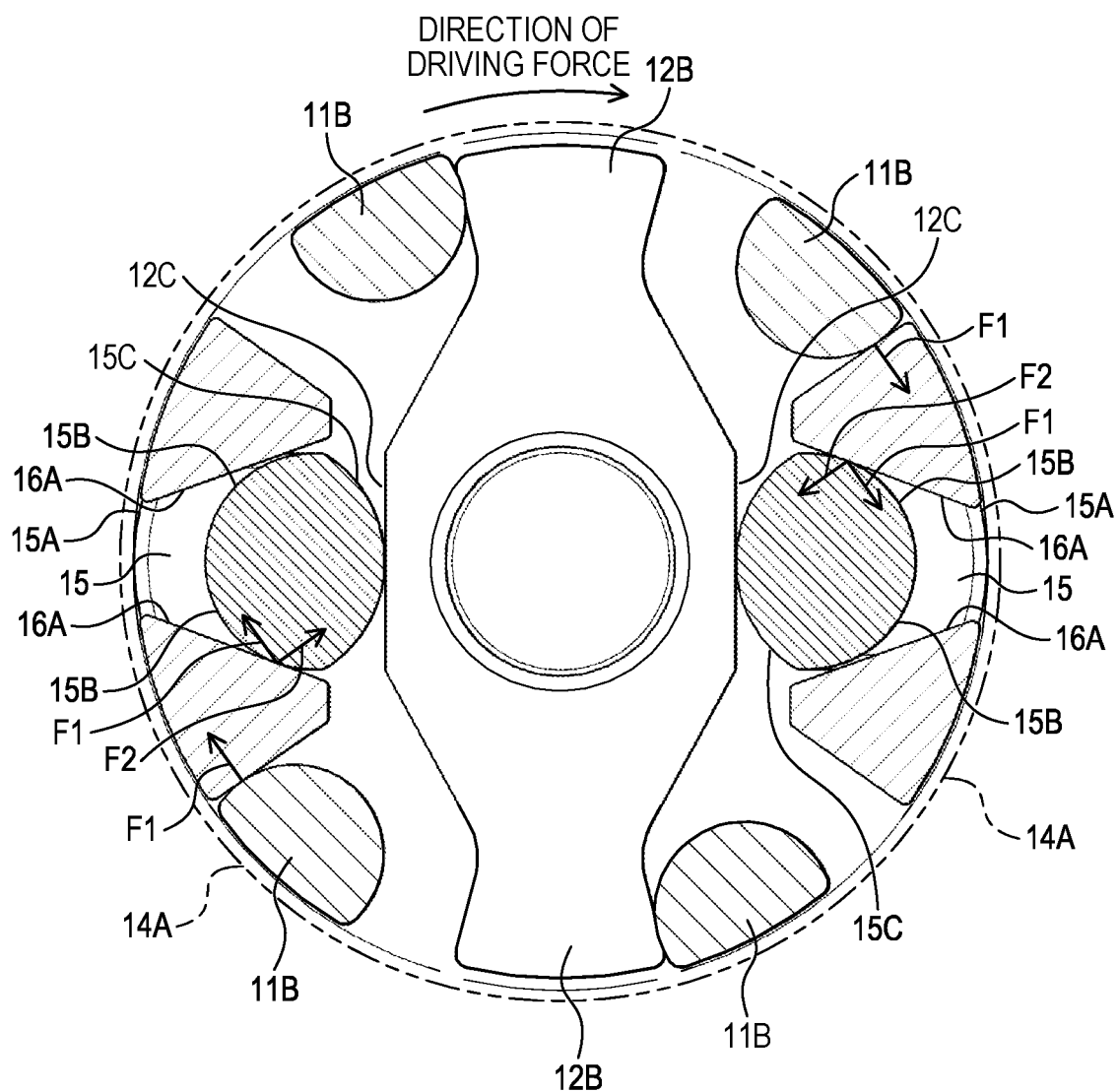
FIG. 11 is a view showing the structure of the unidirectional joint according to the first embodiment and showing a state in which the driving force is input to the input side rotating part.

As shown in FIG. 11, two inclines forming the first follower 15B are surfaces inclined with respect to a radial direction and are planes or curved surfaces inclined such that a distance between the two inclines gets smaller toward the inner circumferential surface 14A. The radial direction is defined as a direction parallel to a diametrical direction of the immovable ring 14.

Figure 10:
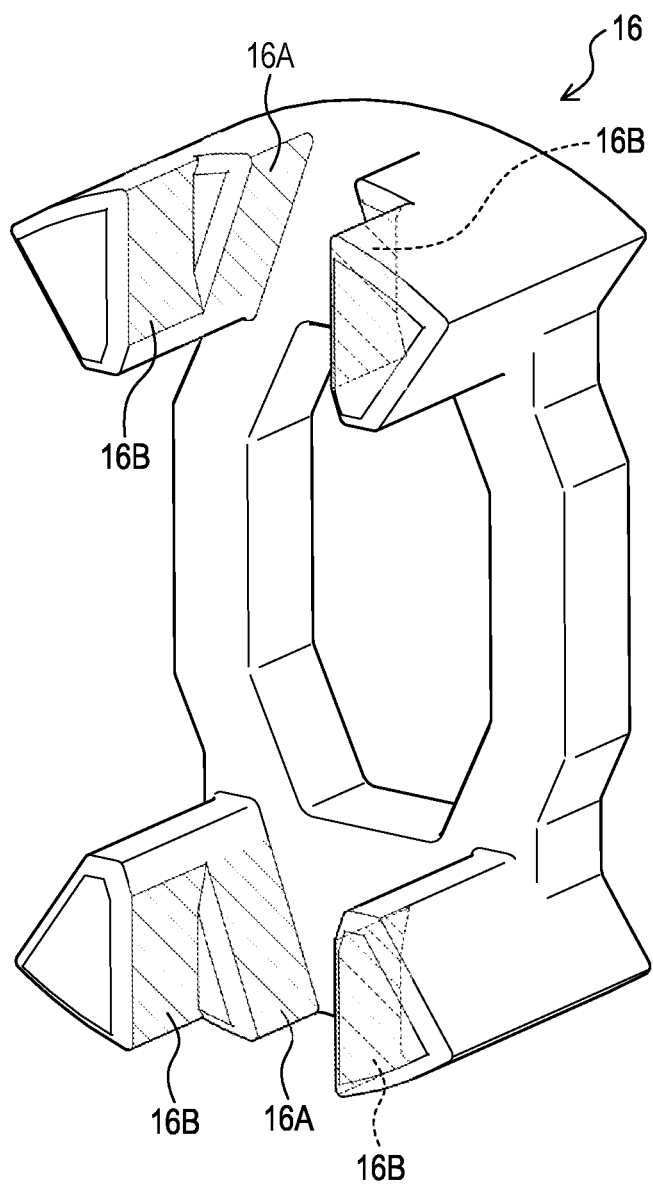
FIG. 10 is a view showing a retainer according to the first embodiment.

As shown in FIG. 10, the retainer 16 is provided with the same number of release cams 16A (hatched areas in FIG. 10) as the first followers 15B. As shown in FIG. 11, each of the release cams 16A is formed of two inclines that interpose the first follower 15B therebetween in a circumferential direction. The circumferential direction is defined as a direction along a circumferential direction of the immovable ring 14.

The retainer 16 is rotatable about the rotation center axis Lo with respect to the input side rotating part 11 and the output side rotating part 12 within a specified angle. Thus, when the driving force acts on the input side rotating part 11, the retainer 16 rotates in a direction of the driving force by receiving the driving force from the input side protrusions 11B.

When the release cam 16A integrally rotates with the input side protrusion 11B, and the release cam 16A comes into contact with the first follower 15B, the first follower 15B generates a force F2 for displacing the wedge member 15 to the unlocked position, in other words, in a direction away from the inner circumferential surface 14A, by receiving a pressing force F1 from the release cams 16A.

In other words, the first follower 15B is formed on a surface inclined in the circumferential direction so as to generate the force F2 for displacing the pressure contact portion 15A to the unlocked position upon reception of the pressing force F1 from the release cams 16A.

Figure 9:
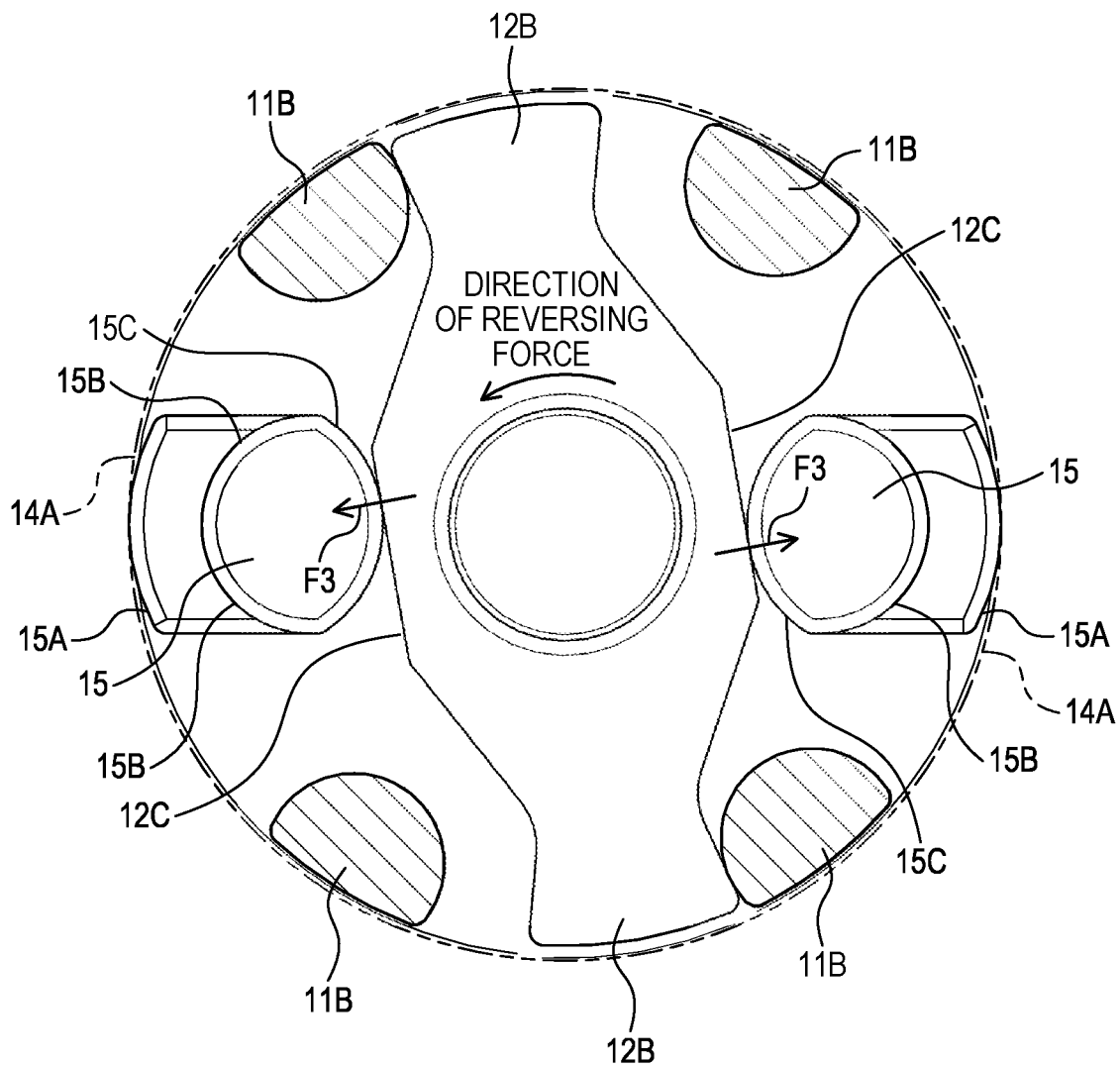
FIG. 9 is a view showing the structure of the unidirectional joint according to the first embodiment and showing a state in which a reversing force is input to the output side rotating part.

As shown in FIG. 7, the second follower 15C is arranged at a position deviated from the first follower 15B. As shown in FIG. 9, the second follower 15C displaces the wedge member 15 to the locked position by receiving a pressing force F3 from the pressure cam 12C when the reversing force is input to the output side rotating part 12.

Figure 12:
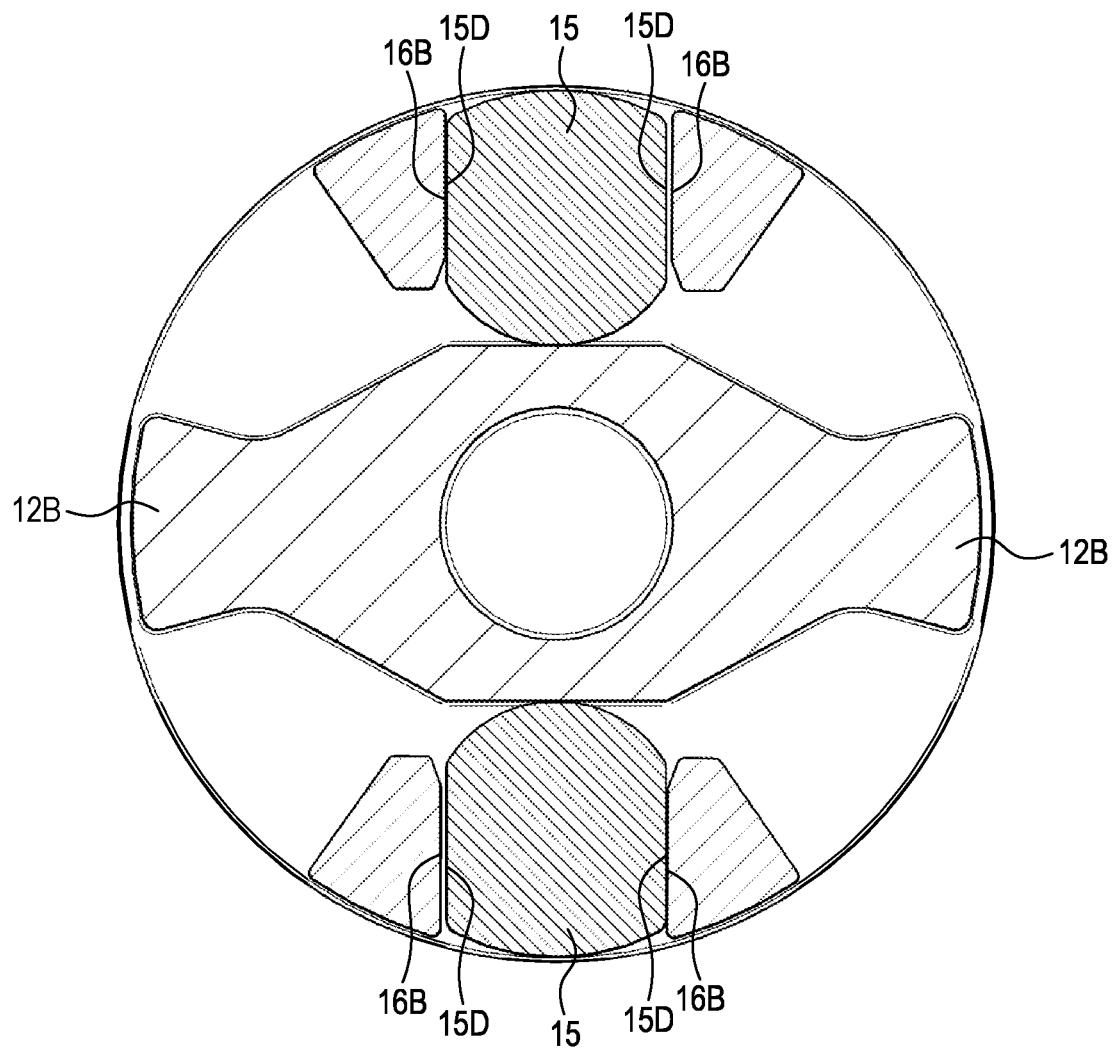
FIG. 12 is a view showing the structure of the unidirectional joint according to the first embodiment.

In the present embodiment, as shown in FIG. 7, a curvature radius R1 of the pressure contact portion 15A is larger than a curvature radius R2 of the second follower 15C. As shown in FIG. 12, the retainer 16 is provided with the same number of holders 16B as the wedge members 15.

Each of the holders 16B is provided for keeping a posture of the wedge member 15. Specifically, the holder 16B is formed of planes provided on radial both sides interposing the wedge member 15. These planes are parallel to the radial direction and slidable in contact with planes 15D (see, FIG. 7) provided in the wedge member 15.

<2. Operation of Unidirectional Joint and Its Characteristics>

Figure 8:
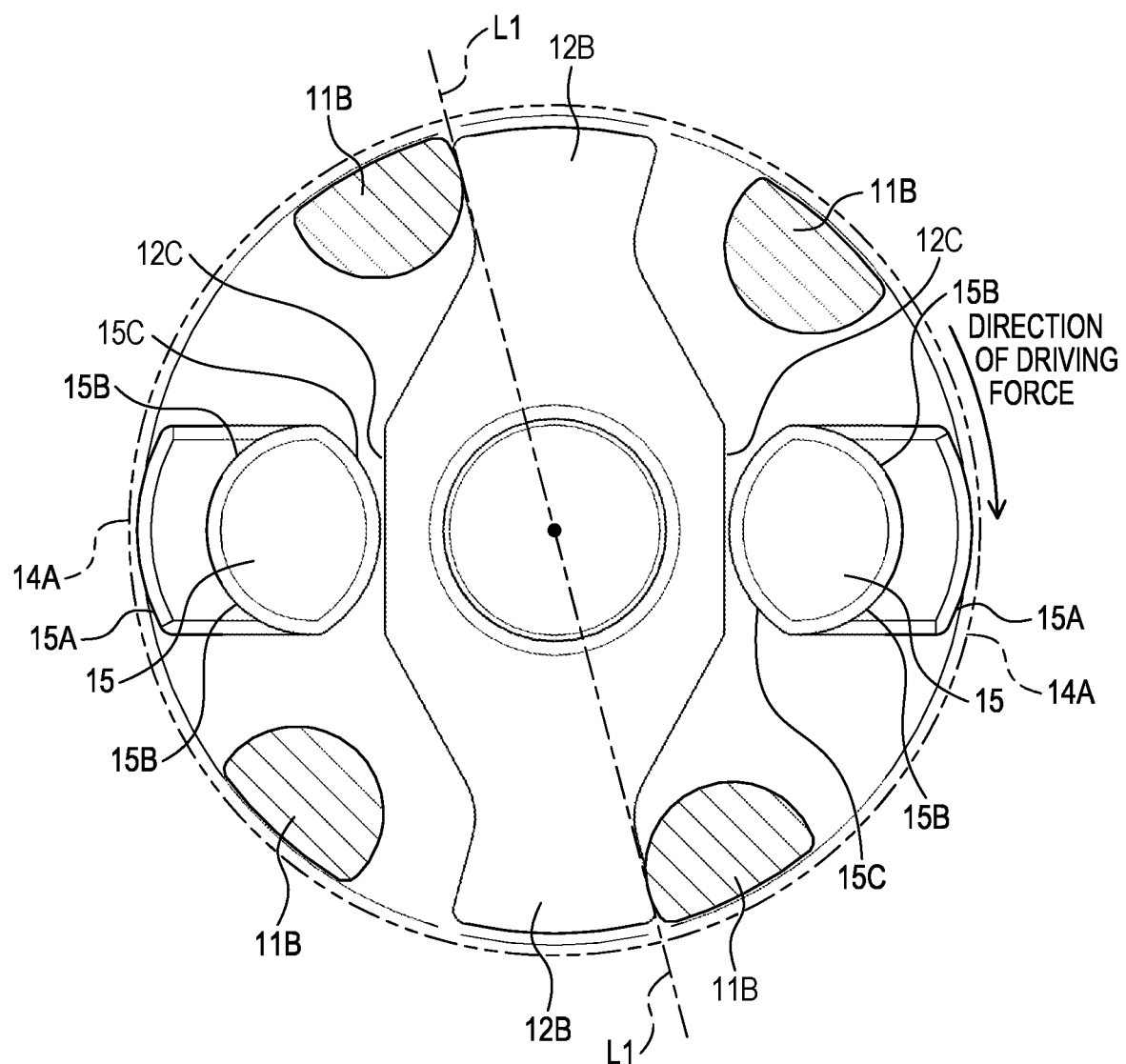
FIG. 8 is a view showing a structure of the unidirectional joint according to the first embodiment and showing a state in which a driving force is input to the input side rotating part.

For example, when the driving force in a clockwise direction as shown in FIG. 8 is input to the input side rotating part 11, each of the input side protrusions 11B and each of the side protrusion 12B engages with one another, and each of the first followers 15B displaces each of the wedge members 15 to the unlocked position by receiving the pressing force F1 from each of the release cams 16A. Due to this, the driving force is transmitted from the input side rotating part 11 to the output side rotating part 12.

Furthermore, for example, when the reversing force in a counterclockwise direction as shown in FIG. 9 is input to the output side rotating part 12, each of the second followers 15C displaces each of the wedge members 15 to the locked position by receiving the pressing force F3 from each of the pressure cams 12C. Due to this, a frictional force between the inner circumferential surface 14A and each of the pressure contact portions 15A is caused, and each of the pressure contact portions 15A bites into the inner circumferential surface 14A, whereby the reversing force is inhibited from being transmitted to the input side rotating part 11.

The wedge member 15 is provided with the first follower 15B displacing the wedge member 15 to the unlocked position and the second follower 15C displacing the wedge member 15 to the locked position, which are arranged separately from each other. Due to this, in the unidirectional joint 10, each of the first follower 15B and the second follower 15C can be formed into a shape suitable thereto.

In the unidirectional joint 10, the posture of the wedge member 15 is kept by the holders 16B. This inhibits rotation of each of the wedge members 15 even when the reversing force is large. Thus, the frictional force between the inner circumferential surface 14A and each of the pressure contact portions 15A can be reliably ensured, and each of the pressure contact portions 15A can be reliably made to bite into the inner circumferential surface 14A.

Other Embodiments

The output side rotating part 12 according to the above-described embodiment is provided with the insertion hole 12D through which the rotor shaft 3A is inserted. However, the present disclosure is not limited to this. For example, if the rotor shaft 3A is short, the insertion hole 12D is not necessary in the present disclosure.

In the above-described embodiment, the curvature radius R1 of the pressure contact portion 15A is larger than the curvature radius R2 of the second follower 15C. However, the present disclosure is not limited to this. The present disclosure may be configured, for example, such that the curvature radius R1 of the pressure contact portion 15A and the curvature radius R2 of the second follower 15C are the same or such that the curvature radius R1 of the pressure contact portion 15A is smaller than the curvature radius R2 of the second follower 15C.

In the above-described embodiment, the vehicle seat according to the present disclosure is applied to an automobile. However, the application of the present disclosure is not limited to this. The present disclosure may be also applied to, for example, seats for vehicles, such as railroad vehicles, ships and boats and aircrafts, and to stationary seats used in theaters or for household use.

Furthermore, the present disclosure may be embodied in various forms within the purpose of the invention described in the embodiments, and the present disclosure is not limited to the aforementioned embodiments. Accordingly, it may be possible to employ a configuration in which at least two embodiments among the aforementioned embodiments are combined, or a configuration in which any of the constituent features shown in the figures or with reference numerals provided in the invention described in the embodiments are omitted.

What is claimed is:

1. A unidirectional joint having an input side rotating part to which a driving force is input and an output side rotating part outputting the driving force, transmitting the driving force from the input side rotating part to the output side rotating part, and inhibiting a driving force input to the output side rotating part from being transmitted to the input side rotating part, the unidirectional joint comprising:

a transmission part including an input side protrusion, which integrally rotates with the input side rotating part, and an output side protrusion, which integrally rotates with the output side rotating part, wherein the input side protrusion and the output side protrusion engage with each other when the driving force is input to the input side rotating part, to thereby transmit the driving force from the input side rotating part to the output side rotating part;

an immovable ring retained in a non-rotatable state;

a wedge member including a pressure contact portion, which comes in pressure contact with a circumferential surface of the immovable ring, the wedge member being configured by a non-rolling element and being displaceable between a locked position where the pressure contact portion comes in pressure contact with the circumferential surface and an unlocked position where the pressure contact is released;

a release cam integrally rotatable with the input side rotating part;

a first follower provided in the wedge member, the first follower displacing the wedge member to the unlocked position by receiving a pressing force from the release cam when the driving force is input to the input side rotating part;

a pressure cam integrally rotatable with the output side rotating part; and a second follower provided at a position deviated from the first follower in the wedge member, the second follower displacing the wedge member to the locked position by receiving a pressing force from the pressure cam when the driving force is input to the output side rotating part.

2. The unidirectional joint according to claim 1, wherein, when a diametrical direction of the immovable ring is defined as a radial direction, the pressure contact portion is deviated with respect to the second follower in the radial direction, and wherein a curvature radius of the pressure contact portion is larger than a curvature radius of the second follower.

3. The unidirectional joint according to claim 2, further comprising a retainer having a holder to keep a posture of the wedge member by interposing the wedge member between both sides of the holder in a circumferential direction, which is a circumferential direction of the immovable ring.

4. The unidirectional joint according to claim 3, wherein the release cam is arranged at the retainer, and wherein, when the driving force is input to the input side rotating part, the retainer is pressed by the input side protrusion, whereby the release cam presses the first follower.

5. The unidirectional joint according to claim 4, wherein the output side protrusion and the pressure cam are integrated in the output side rotating part.

6. The unidirectional joint according to claim 1, wherein the output side protrusion and the pressure cam are integrated in the output side rotating part.

7. The unidirectional joint according to claim 2, wherein the output side protrusion and the pressure cam are integrated in the output side rotating part.

8. The unidirectional joint according to claim 3, wherein the output side protrusion and the pressure cam are integrated in the output side rotating part.

* * * * *